April 26, 1955 R. HUG 2,706,963
DEVICE FOR FIBER-COATING MATERIALS AND OBJECTS
Filed April 12, 1950 3 Sheets-Sheet 1

INVENTOR.
Rudolf Hug.
BY
C. M. Avery
ATTORNEY

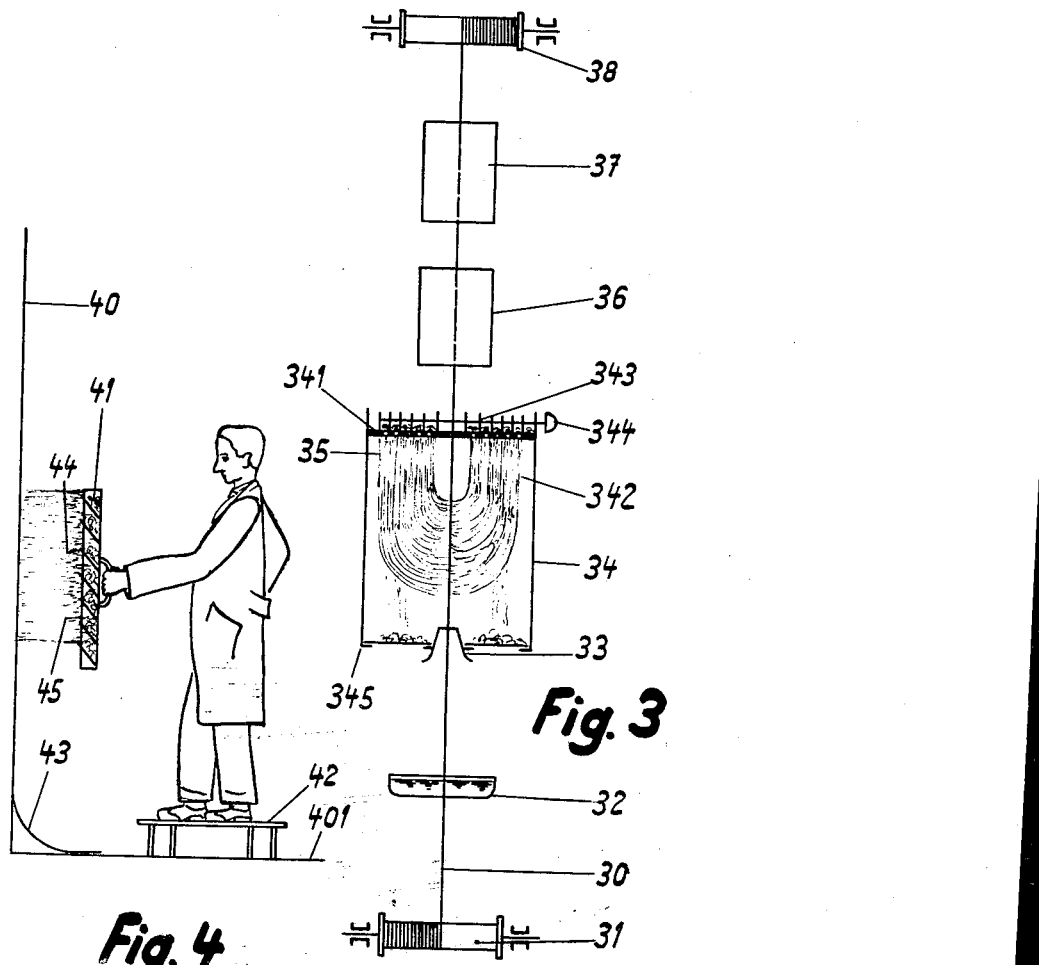

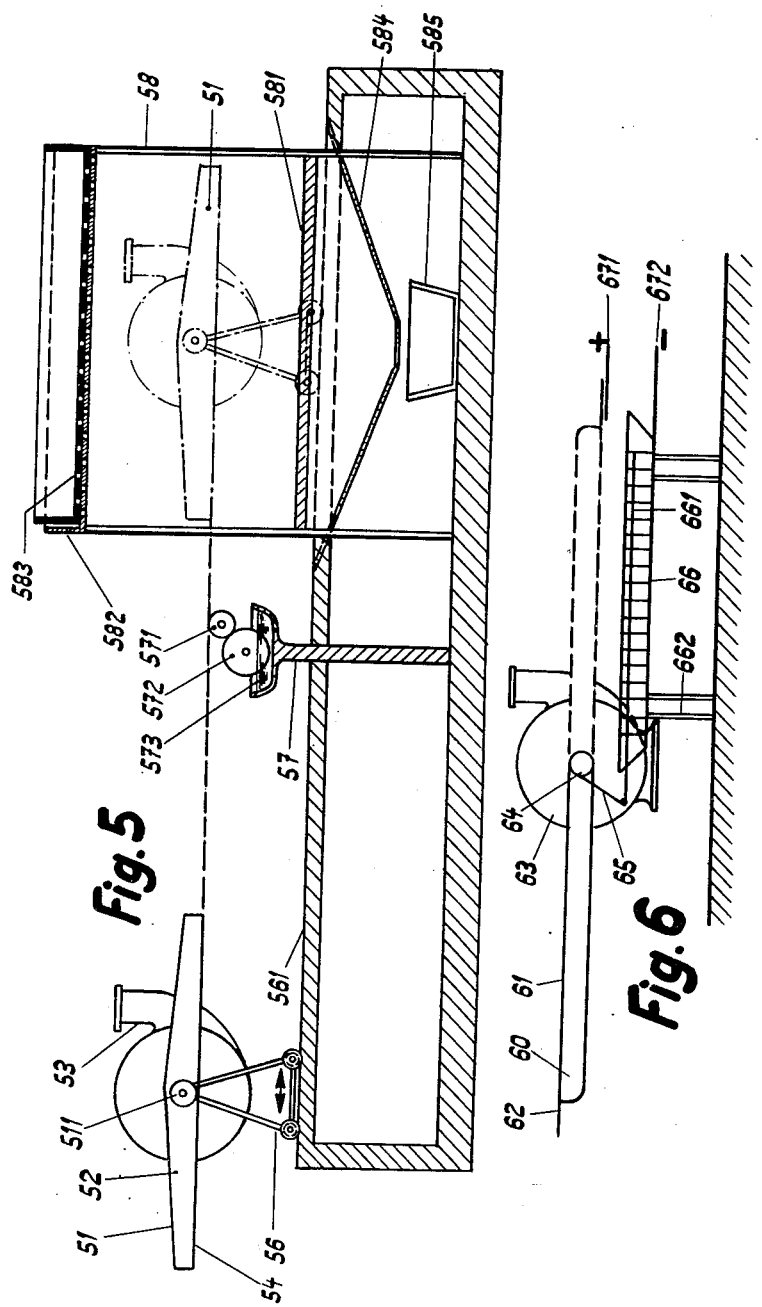

United States Patent Office 2,706,963
Patented Apr. 26, 1955

2,706,963
DEVICE FOR FIBER-COATING MATERIALS AND OBJECTS

Rudolf Hug, Zurich, Switzerland

Application April 12, 1950, Serial No. 155,533

Claims priority, application Switzerland July 5, 1949

2 Claims. (Cl. 118—51)

My invention relates to methods and apparatus for the fiber-coating (flock-coating) of objects by means of an electric field whose force causes the fibers to be moved and directed toward the object to be coated where they are held by an adhesive.

The known processes and apparatus of this kind are not suitable for producing flock coats on such diversely shaped objects of daily use as boxes, bags, toys, bottles, jewelry cases, nor for flock-coating all surfaces of such objects. It has also been difficulty to apply a flock coat to plate-like objects, or strings, cords, insulated wires, and the like. Large surfaces, such as walls, cannot be flock-coated with the known processes and devices.

It is an object of my invention to remedy these deficiencies.

According to the invention, process and apparatus for the flock-coating of objects by means of an electric field involve the application of an electric field potential to the adhesively coated body to be flocked so that its entire exposed surface acts directly as an electrode surface of the field. According to another feature of the invention the other pole of the source of electric potential is connected with a flock holding structure or receptacle from which the fibrous flock material moves toward the body to be coated.

These and other features of my invention, set forth with particularity in the claims annexed hereto, will be apparent from the following description in conjunction with the accompanying drawings which illustrate, by way of example, various embodiments of the invention.

In the drawings:

Fig. 3 is a diagrammatic view of a device for the fiber-coating of strings, cords, wires, or the like;

Fig. 4 shows the application of the process according to the invention for fiber-coating a large surface, such as a wall; and Figs. 5 and 6 show respective apparatus for the fiber-coating of plate-like objects.

Figure 1:
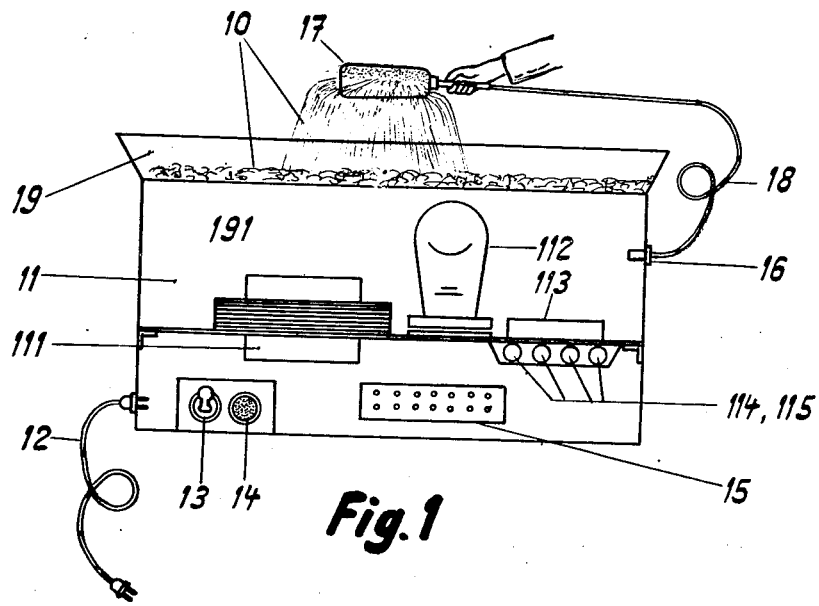
Fig. 1 shows a device for the flock-coating of various objects of daily use.

Referring to Fig. 1, the illustrated device has a housing 11 which encloses rectifying and filtering circuit components representing a source of a high electric potential, for instance, of 20 kv. between the output poles. The components of this source comprise a transformer 111, a rectifier tube 112 and filtering means composed of a choke coil 113, a condenser 114, and resistors 115. A connecting cable 12 serves to energize the rectifier from an A. C. power line, for instance, of 200 v. under control by a switch 13 joined with a pilot lamp 14. A terminal board 15 is provided for the internal connections of the device. One output pole 16 of the filtering means is connected with an object by a flexible, highly conductive electric conductor 18. The device has a pan-shaped fiber receptacle 19 connected with the other pole (not shown) of the potential source. The bottom 191 of receptacle 19 on which the fibers 10 rest preferably consist of, or is provided with, sheet metal. For reasons of safety, the edge of the fiber container 19 preferably consists of insulating material.

The operation of the device is as follows: The object 17 to be flocked is first coated with an adhesive. When switch 13 is turned on, the line voltage is applied to the source of potential and an electric field is produced between the object 17 to be fiber-coated and the bottom 191 of receptacle 19. This field causes the fibers 10 (as shown in Fig. 1) to move towards the adhesive-coated object 17, where they are held. As the bottom 191 consists of metal or is provided with sheet metal, the electric lines of force emerge essentially vertically from the bottom 191 which acts as an electrode. The elongated fibers are aligned in the direction of the electric field and strike the object 17 with one end so that the fiber-coated areas assume a velvet, velour or suede-like appearance according to the fiber material employed.

It has been previously mentioned that the connection 18 preferably consists of a highly conductive lead. Since currents of only a few milliamperes are required for fiber-coating such objects, a high-resistance connecting lead between the one pole 16 and the object to be fiber-coated will suffice depending upon the voltage. Thus the human body may serve as connecting lead, one pole of the potential source being grounded and the object to be fiber-coated being moved towards the other electrode by hand until the fibers jump across to the object. The preferable distance of the object 17 from the other electrodes, e. g. the bottom 191, is dependent on the potential. With a potential of 5–20 kv. this preferable distance is approximately 2–12 cm., it being understood that higher potentials, such as 30 kv. and more, may be used. The height of potential is in the first place determined by the particular application of the fiber-coating device, the object to be fiber-coated, the desired type of fiber-coating, and the fibers employed.

The device described is preferably designed as a portable apparatus with which any desired objects, such as bottles, wooden handles, metal parts, toys, cases, fabric or suede shoes can be fiber-coated in the simplest possible manner. Such apparatus may be built in the size of 20 x 30 x 15 cm. with a weight of some kilograms. As mentioned, it is not necessary to connect the object to be fiber-coated directly with the one pole of the potential source. A sufficient density of fibers can also be obtained by applying one pole of the potential source to the fiber container while the other pole is grounded so that the human body serves as a connecting lead between this pole and the objects to be fiber-coated. The device described may also be equipped with a structure for holding the object to be fiber-coated. Such a holding structure is preferably adjustable so that the object may be manually or mechanically positioned or shifted in accordance with the required fiber density.

Figure 2:
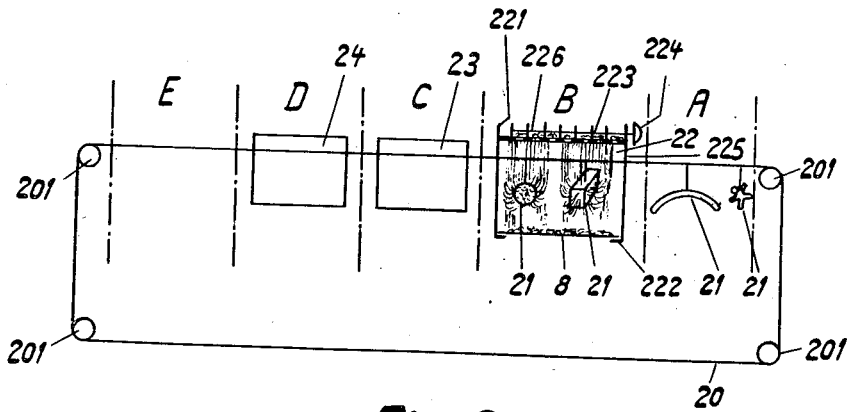
Fig. 2 shows diagrammatically a similar device as part of a continuously operating apparatus.

The apparatus illustrated in Fig. 2 is suitable for continuously fiber-coating individual objects and mass-produced articles. An endless conveyor 20 passing over guide rolls 201 is moved by driving means (not shown) in the direction indicated by an arrow. The objects 21 (mass-produced articles) to be fiber-coated are suspended from conveyor. The conveyor 20 consists of a highly conductive material, such as a steel wire. The connection between the object 21 to be fiber-coated and the conveyor 20 is also highly conductive. The conveyor 20 is connected to the one pole of the potential source (not shown), the other pole of the potential source being applied to the fiber container. Numeral 22 designates the fiber-coating device proper which comprises a fiber container 221 with a perforated bottom 226, a fiber collector 222, a rake-like device 223 disposed in the fiber container 221 and operable by diagrammatically indicated driving means 224, and a tunnel-shaped box 225. Diagrammatically shown at 23 is a device in which the fiber-coated objects are dried. A suction device is provided at 24 for removing any loose fibers from the dried objects.

The operation of the device is best described with reference to the various operation stages of which there are five, corresponding to five consecutive portions A to E of the path of travel of the objects. First the potential is switched on and the conveyor 20 put in motion. At the stage A, the objects to be fiber-coated are attached to the conveyor, the areas to be fiber-coated having previously been coated with adhesive. The application of the adhesive may be effected in the known manner by dipping, brushing or spraying. When using the spraying method the adhesive may be applied after attaching the objects to the conveyor 20. Then the adhesive-coated objects 21 pass into operation stage B where they are fiber-coated. The conveyor carrying the objects passes into the tunnel-shaped open-ended box 225. On actuation of the rake-like device 223 by the driving means 224, the fibers lying in the container 221 fall through the perforated bottom 226 into the interior of the box where they are moved towards the objects by the electric field produced between the fiber container and the object. Since the fibers are charged in the electric field when falling, the object to be coated is impinged upon by fibers not only from above, but also from the sides and from below. Hence all surfaces of the object 21 are coated practically simultaneously. The falling excess fibers are caught by the fiber collector 222 from which they may be returned from time to time to the fiber container 221.

After being coated, the fiber-coated objects are subjected to the third operation in stage C. Here the objects are dried, for instance in a heating and drying stove of any design known for such purposes, the drying being accomplished by any source of heat, such as electricity, steam, hot water, infra-red rays or the like.

The fourth operation, in stage C, comprises the removal of the non-adherent fibers. To this end a device 24 is employed in which compressed air produced by a fan, is passed along the fiber-coated objects at a predetermined speed thus blowing off any loose or loosely adherent fibers. The outgoing air, which contains excess fibers, may be passed through a dust separator (not shown) in which the fibers are caught for subsequent use.

Lastly, in the fifth stage E of the operation, the fiber-coated and finished objects are removed from the conveyor 20.

Such continuously operating apparatus for the flock-coating of individual objects, of course, may be modified in various ways without departing from the process principle of having the object to be coated directly connected with one pole of the potential source.

In the apparatus according to Fig. 3, the material to be fiber-coated such as an insulated strand 30, passes from a supply roll 31 through an adhesive container 32. A scraper 33 serves to remove the excess adhesive, which drops back into container 32. Mounted on top of a funnel-like box 34 is a fiber container 341 with a perforated bottom 342. A movable, rake-like device 343, arranged in the fiber container, may be mechanically or manually reciprocated by means of a drive member 344. When the rake-like device is actuated, the fibers 35 shower downward through the funnel. The entire box 34 is electrically insulated. One of the potential source (not shown) is connected to the fiber container 341. The other pole is connected with strand 30. Hence the fiber container 341 and the fibers contained therein are under voltage, so that the fibers when showering downward in the funnel-like box 34 are caused by the electric field between the strand 30 and container 341 to move toward the strand 30, where they are held by one end on the adhesive-coated surface. The loose fibers, i. e. the fibers not attracted by the strand 30, fall into the fiber collector 345 which must be emptied from time to time.

In a manner similar to that described in Fig. 2, the fiber-coated strand emerging from box 34 is dried in a drier 35, subsequently freed from loose fibers by passing through a suction box 37, and finally wound up on the take-up reel 38.

While the details of this apparatus may also be given various modifications, the essential principle again lies in the fact that the strand-like object to be fiber-coated is connected with one pole of the potential source, so that the field attracting the fibers has a particularly high degree of intensity.

Fig. 4 shows how the process according to the invention may be applied for the fiber-coating of walls. The numeral 40 designates a perpendicular wall coated with adhesive, 41 denotes a portable fiber container with one or more handles. One pole of the potential source (not shown) is connected to the adhesive-coated wall 40. The other pole is connected with the top of a foot-stool 42 which is insulted from the floor. It may, however, also be connected directly with the fiber container 41. In the latter case, the insulated foot-stool 42 is no longer necessary, provided the handle of the fiber container 41 is insulated. The electric field now exists between the fiber container and the wall, so that the fibers move horizontally from the fiber container towards the wall, being held there by one end by the adhesive. The fiber container 41 preferably comprises upwardly directed compartments 44 of the lattice-blind type for holding the fibers 45. In this manner, the fibers can be prevented from inadvertently dropping out of the container. To facilitate collecting any such fibers, a collector device 43 may be provided, consisting, for instance, of paper or cardboard, which also collects the fibers not adhering to the wall. In order to secure a highly homogeneous field between the fiber container and the wall, it is advisable to make the container of insulating material and to line its bottom with metal.

The apparatus shown in Fig. 5 has a hollow table structure 51 whose interior 52 is connected with a suction blower 53. The table plate 54 supporting the object to be fiber-coated is provided with holes (not shown) in a sieve-like manner so that the object to be fiber-coated adheres to the plate 54 when the suction blower 53 is in operation. The table structure 51 can be rotated at least 180° about a pivot 511 so that the table top plate 54 may be turned upwards. The table structure, together with the suction blower, is mounted on a wheeled frame 56 which can be reciprocated on a base 561 in the direction of the double arrow. Mounted on the base is a device 57 for the application of adhesive to the object to be fiber-coated. Device 57 has a rubber roller 571 which applies the adhesive in an even layer to the object when the table, in the position illustrated is moved past the device to the right. An intermediate roller 572 transfers the adhesive from a container 573 to the rubber roller 571. To secure a satisfactory application and distribution of the adhesive on the object to be fiber-coated, the peripheral speed of the rubber roller 571 is different from the speed of the table brushing past the roller. A fiber receiving table 581, serving as the flock receptacle during the flocking operation, is mounted on a frame 58 and is adjustable in height so that the distance between the moved-in table structure 51 and the fiber table 581 may be adjusted as desired. A fiber storage container 582 is arranged on the top of the frame 58 and is equipped with a fiber rake 583. The bottom of container 582 consists of perforated sheet metal, e. g. a sieve or wire mesh. The fiber rake 583 may be similarly constructed and reciprocated manually or mechanically. The reciprocating movement of the fiber rake causes the fibers to shower onto the fiber-receiving table 581 so that the latter is evenly covered. A funnel-shaped collector 584 at the bottom portion of frame 58 serves to guide overflow fibers into a container 585. The D. C. or A. C. potential required for the electric field is connected to the fiber-receiving table 581 on the one hand and to the object-supporting table 51 on the other hand. The electric connections may be such that the potential is applied only when the table structure 51 is completely moved into the frame 58, i. e. when it is in the position indicated by dot-dash lines. The plate 54 of table structure 51 and the fiber table 581 are then opposite and parallel to each other. The connection of the source of potential may be effected in any known manner and is therefore not shown in the drawing.

The operation of the device is as follows:

The flock material is placed in the fiber container 582, whereupon the fiber rake is reciprocated. The rake movement may be coupled with the tilting and moving of the table structure 51 so that the fiber table 581 is automatically charged with flock after each coating operation. Due to the rake movement, the fibers fall through the openings in the bottom of the fiber container 582 onto the fiber table 581 and cover the table in an even layer. In the inoperative position of the rake practically no fibers will fall on the fiber table. It is advisable to allow the fiber table 581 to hold just the amount of fibers necessary for one fiber-coating operation. During the just-mentioned charging of the flock table 581 with material, the table structure 51 is tilted by 180° from the illustrated position so that the plate 54 faces upwards. Now the sheet or foil-shaped object to be fiber-coated is placed on the table plate 54 and the suction blower is switched on. The table 51 is then tilted back 180° into the illustrated position. Then, the fiber-coating table is moved toward the fiber table 581 thus passing the adhesive applicator 57 so that the surface to be fiber-coated is covered with adhesive by rubber roller 571. When the table 51 has reached its extreme position in the frame 58, the electric potential is applied. The electric field then produced between the object table 51 and the fiber table 581 causes the fibers to fly from the fiber table 581 to the adhesive-coated object on plate 54. The fibers, longitudinally aligned in accordance with the electric field, adhere with one end to the object to be fiber-coated. Thereafter the table 51 is removed from the frame 58, the adhesive application 57 then being lowered by means not shown so that the rubber roller 571 stays clear of the fiber-coated object. On arrival at its initial position, the table 51 is tilted upward, the suction blower switched off, and the fiber-coated object may now be removed from the plate 54. The device is now set for another fiber-coating operation. The fiber-coated sheet is dried and subjected to the action of a suction device to remove any loosely adherent fibers.

It is advisable to employ a highly homogeneous electric field in order to obtain even fiber coating. In order to produce such a field, the top of the object-supporting table 51, i. e., the plate 54, is provided with a metal surface connected with one pole of the potential source. Similarly it may be advisable to provide the surface of the fiber-receiving table 581 with a metal surface connected with the other pole of the potential source. The metal surfaces may consist of sheet metal or of metallized coatings. As previously mentioned, it may be preferable to dry the fiber-coated object immediately after the coating operation and to remove loosely adherent fibers therefrom. The devices for these operations are preferably mounted together with the flocking devices described.

In order to prevent the fibers fed from the fiber-showering device from falling beside the fiber table, a screen (not shown) may be provided.

For each application, the most advantageous distance between the plate 54 and the upper surface of the fiber table 581 can be determined by sample tests. Apart from the potential, some of the facts determining the most favorable distance are the length and weight of the fiber material used, and the density of the coating desired.

The tilting of the object-supporting table 51 may be coupled with a fiber rake in container 582 so that the rake is moved with each tilting of the former table to loosen the fibers in the storage container.

The embodiment shown in Fig. 6 differs from that of Fig. 5 by having the fiber receiving table designed as a fiber storing container. This permits several simplifications in apparatus design. According to Fig. 6 the object-supporting table structure 60 has a perforated top plate 61 for receiving the objects to be flock coated. An electric contact piece 62 is attached to the table. A blower 63 communicates with the interior of the table structure through a suction nozzle 64 about whose axis the table structure can be turned 180° to the position shown by broken lines. The table structure is linked through connecting rods to a rake-like device 661 in a fiber container 66 which is insulated from ground by a support 662. Leads 671 and 672 serve to connect the apparatus to the potential source (not shown) supplying, for instance, a D. C. potential. After the object to be fiber-coated is placed on the table top plate 61, the suction blower 63 is switched on thus holding the object on plate 61. Then the table 60 is turned 180° so that it lies above the fiber container 66. The connecting rods 65 cause the rake 661 in the fiber container 66 to be moved with every tilting motion of the table so that the fibers are prevented from felting. When the table 60 is fully tilted, the contact piece 62 establishes contact with lead 671 and hence with one pole of the potential source. As a fiber container 66 is connected through lead 672 with the other pole of the potential, an electric field is produced between table and container, so that the fibers are attracted from the fiber container to the adhesive-coated object.

Apparatus of the type described with reference to Figs. 5 and 6 are capable of producing an evenly distributed fiber coat on sheet or foil-shaped objects in a simple manner and a minimum of time. The good results obtainable with such apparatus are due to the fact that, since one pole of the electric field is identical with the object surface to be coated, this object being disposed directly on the one potential pole designed as a metal surface of the object-holding table, a highly homogeneous and intense electric field is obtained.

The examples described show that the process disclosed is suitable for fiber-coating small or large objects of any shape or kind. Moreover, these objects may consist of any material, such as paper, cardboard, wood, metal, glass, plastic of any type, cork, leather, or textiles. The most suitable fiber materials are cotton, wool, silk, rayon, asbestos, nylon, felt and cellulose. As mentioned, various effects may be obtained according to the fiber material used, and in particular according to the length of fiber. Thus fibers of approximately 0.5 mm. length give the coated object a suede effect, objects coated with fibers of approximately 1 mm. length assume a velour character and with fibers of approximately 1.5 mm. length the effect is that of velvet.

I claim:

1. Apparatus for applying fibrous flock to adhesively coated objects, comprising a housing structure having an electrically conductive top wall, said wall forming a continuous sheet and forming an upwardly open pan-shaped receptacle for fibrous stock on said top wall, a source of electric potential disposed in said housing structure and having two poles, one of said poles being connected with said top wall, and a flexible electric conductor for connecting the other pole with an object, said conductor being long enough to permit holding an object, attached to said conductor, above said receptacle, whereby the object is coated with flock when held above said receptacle.

2. Apparatus for applying fibrous flock to adhesively coated objects, comprising a portable housing structure having an electrically conductive wall forming a continuous sheet, an outwardly open receptacle formed by said structure on said wall for supporting the fibrous stock, a source of potential comprising a flexible cable extending from said housing structure and voltage step-up means connected to said cable and disposed in said housing, said step-up means having two poles of respectively different electric potentials for providing an electric flock-directing field between said structure and the object to be flocked, one of said poles being conductively connected with said housing wall, a flexible electric conductor for connecting said other pole with an object, said conductor being long enough to permit holding an object, attached thereto, adjacent to said receptacle, whereby the object is coated with flock when placed adjacent to said receptacle.

References Cited in the file of this patent
UNITED STATES PATENTS

| Number | Name | Date |
|---|---|---|
| 1,788,600 | Smyser | Jan. 13, 1931 |
| 2,047,525 | Thode | July 14, 1936 |
| 2,173,078 | Meston | Sept. 12, 1939 |
| 2,174,328 | Meston | Sept. 26, 1939 |
| 2,187,306 | Formhals | Jan. 16, 1940 |
| 2,258,092 | Fogg | Oct. 7, 1941 |
| 2,279,361 | Amstuz | Apr. 14, 1942 |
| 2,356,489 | Amstuz | Aug. 22, 1944 |
| 2,376,922 | King | May 29, 1945 |
| 2,447,374 | Smyser | Aug. 17, 1948 |
| 2,548,872 | Cross | Apr. 17, 1951 |